(12) United States Patent
Shimizu

(10) Patent No.: US 9,235,302 B2
(45) Date of Patent: Jan. 12, 2016

(54) INPUT DEVICE

(71) Applicant: Kabushiki Kaisha Tokai Rika Denki Seisakusho, Aichi (JP)

(72) Inventor: Tomomi Shimizu, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 36 days.

(21) Appl. No.: 13/943,268

(22) Filed: Jul. 16, 2013

(65) Prior Publication Data

US 2014/0022207 A1    Jan. 23, 2014

(30) Foreign Application Priority Data

Jul. 18, 2012  (JP) .................................. 2012-159411

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ....... G06F 3/044; G06F 3/0416; G06F 3/041; G06F 3/0414
See application file for complete search history.

(56) References Cited

U.S. PATENT DOCUMENTS

2008/0062140 A1* 3/2008 Hotelling et al. ............. 345/173
2013/0257786 A1* 10/2013 Brown et al. ................. 345/174
2013/0278538 A1* 10/2013 Brunet et al. ................. 345/174

FOREIGN PATENT DOCUMENTS

JP    2011-076515    4/2011

* cited by examiner

*Primary Examiner* — Kenneth B Lee, Jr.
(74) *Attorney, Agent, or Firm* — Roberts Mlotkowski Safran & Cole P.C.

(57) ABSTRACT

An input device includes a selection circuit that is connected to a plurality of electrodes provided on a capacitive touch panel and selectively connects the plurality of electrodes, a calibration resistor connected to the selection circuit, a constant current source for supplying constant current power to the plurality of electrodes and the calibration resistor, an A/D converter connected to the selection circuit to measure capacitance of the plurality of electrodes and a measured value measured when the calibration resistor is connected, and a control unit controlling the selection circuit to make the A/D converter measure the capacitance of one of the plurality of electrodes and the measured value measured when the calibration resistor is connected, and determining a contact coordinate of the touch object on a touch panel by calculating a ratio of the capacitance to the measured value.

5 Claims, 4 Drawing Sheets

INPUT DEVICE

The present application is based on Japanese patent application No. 2012-159411 filed on Jul. 18, 2012, the entire contents of which are incorporated herein by reference.

BACKGROUND OF THE INVENTION

1. Field of the Invention

The invention relates to an input device.

2. Description of the Related Art

An input device is known that a false detection is prevented by measuring time for charging electrodes on a capacitive touch panel and time for discharging them (see, e.g., JP-A-2011-076515).

The input device has plural pairs of electrodes two-dimensionally arranged in a touch detection area, a selection circuit sequentially selecting each of the plural pairs of electrodes, a charge circuit for charging a pair of electrodes selected by the selection circuit, a charge time measuring circuit for measuring charge time from when the charge circuit starts charging the pair of electrodes until reaching a predetermined upper threshold, a discharge circuit for discharging the pair of charged electrodes and a discharge time measuring circuit for measuring discharge time from when the discharge circuit starts discharging the pair of electrodes charged to the predetermined upper threshold until reaching a predetermined lower threshold, and the input device determines, based on a ratio of the charge time to the discharge time, whether contact of a touch object in a touch area is detected or it is false detection.

SUMMARY OF THE INVENTION

The input device disclosed in JP-A-2011-076515 can determine whether or not it is a false detection, but it only detects a contact without suppressing the influence of noise to cause the false detection.

It is an object of the invention to provide an input device that can correctly detect a contact while suppressing the influence of noise.

(1) According to one embodiment of the invention, an input device comprises:
- a selection circuit that is connected to a plurality of electrodes provided on a capacitive touch panel and selectively connects the plurality of electrodes;
- a calibration resistor connected to the selection circuit;
- a constant current source for supplying constant current power to the plurality of electrodes and the calibration resistor;
- an A/D converter connected to the selection circuit to measure capacitance of the plurality of electrodes and a measured value measured when the calibration resistor is connected; and
- a control unit controlling the selection circuit to make the A/D converter measure the capacitance of one of the plurality of electrodes and the measured value measured when the calibration resistor is connected, and determining a contact coordinate of the touch object on a touch panel by calculating a ratio of the capacitance to the measured value.

In the above embodiment (1) of the invention, the following modifications and changes can be made.

(i) The control unit controls the selection circuit to disconnect the plurality of electrodes except the one electrode so that the A/D converter measures a first capacitance of the one of the plurality of electrodes and then to ground the plurality of electrodes except the one electrode so that the A/D converter measures a second capacitance of the one of the plurality of electrodes, and compares the first and second capacitances to determine whether or not a water droplet is present on a detection surface of the touch panel.

(ii) The plurality of electrode each comprise a pair of electrodes.

(iii) The capacitance of the one of the plurality of electrodes is measured when disconnecting the plurality of electrodes except the one of the plurality of electrodes.

(iv) The measured value measured when the calibration resistor is connected is measured when disconnecting the plurality of electrodes except the one of the plurality of electrodes.

(v) When there is a difference between the first capacitance and the second capacitance, it is determined that the water droplet is present on the detection surface of the touch panel.

POINTS OF THE INVENTION

According to one embodiment of the invention, an input device is constructed such that a calibration resistor $R_{CAL}$ is connected to the MUX and the ratio of a measured value when the calibration resistor $R_{CAL}$ is selectively connected, to a capacitance measured when one of plural electrodes is selectively connected is calculated. Thus, it is possible to detect contact of the touch object with the touch panel by suppressing influence of noise by calibrating using the ratio.

BRIEF DESCRIPTION OF THE DRAWINGS

Next, the present invention will be explained in more detail in conjunction with appended drawings, wherein.

DESCRIPTION OF THE PREFERRED EMBODIMENTS

Structure of Input Device

Figure 1:
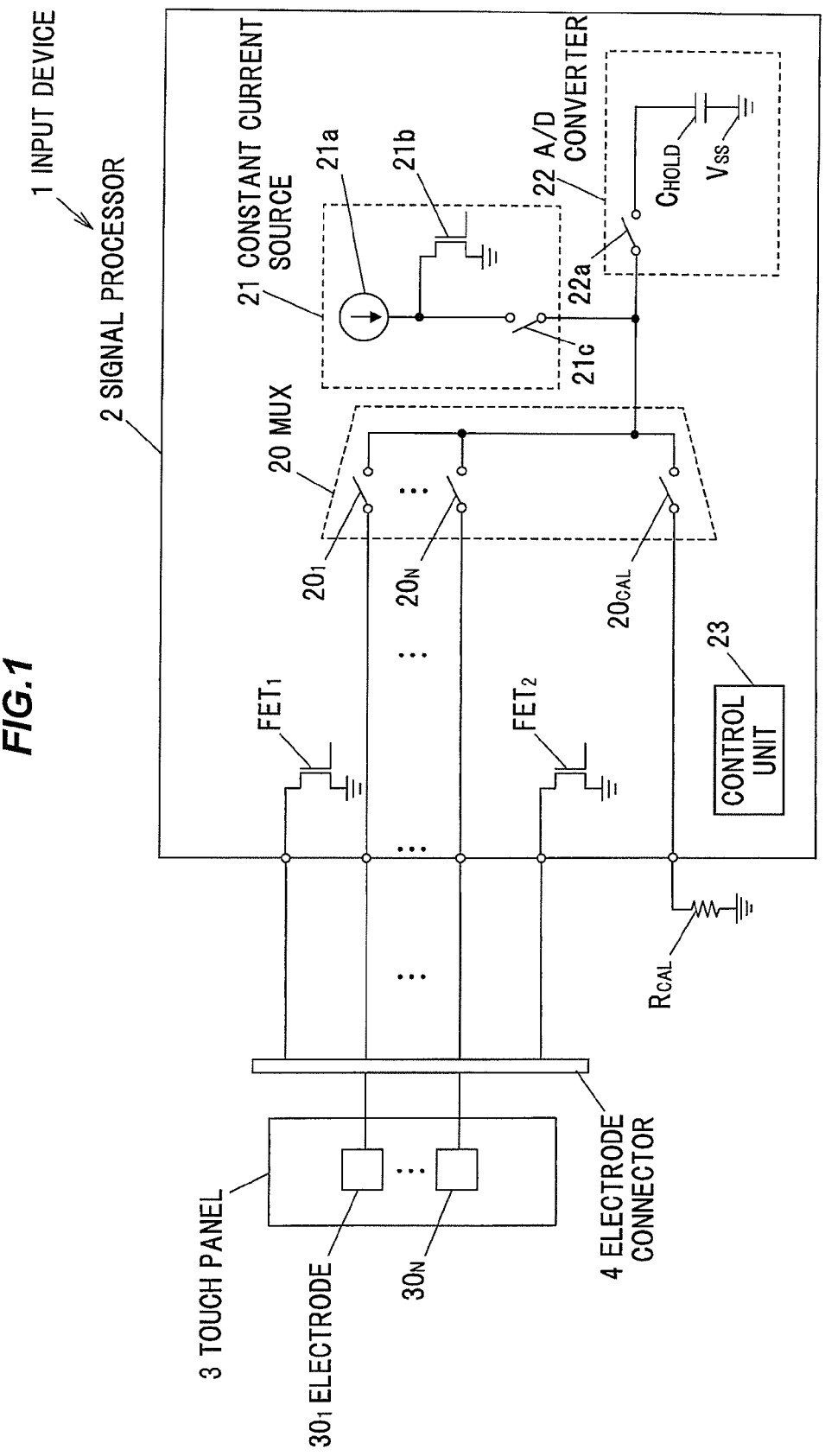
FIG. 1 is a schematic view showing an example of a structure of an input device in an embodiment.

FIG. 1 is a schematic view showing an example of a structure of an input device in the embodiment.

An input device 1 has a signal processor 2 which detects a contact coordinate on a capacitive touch panel 3 by detecting a change in capacitance based on an input operation by an operator, the touch panel 3 having electrodes $30_1$ to $30_N$ provided in a matrix manner under a touch detection area, and an electrode connector 4 for connecting the signal processor 2 to the touch panel 3.

The input device 1 is used as, e.g., an operating portion of air conditioner or audio device, etc., in a vehicle or an operating portion of electrical appliance such as portable music player or mobile phone.

The signal processor 2 has a multiplexer 20 (hereinafter, referred to as "MUX") as a selection circuit, a constant current source 21 for generating a constant current, an A/D converter 22 for converting an input analog signal into a digital signal, a calibration resistor $R_{CAL}$, field-effect transistors $FET_1$ and $FET_2$ and a control unit 23.

The MUX 20 has switches 20$_1$ to 20$_N$ as well as a switch 20$_{CAL}$, and changes ON/OFF state thereof so that the electrodes 30$_1$ to 30$_N$ of the touch panel 3 and the calibration resistor R$_{CAL}$ are sequentially connected.

The constant current source 21 has a power source 21a for generating a constant current, a FET 21b for controlling output of the constant current from the power source 21a to outside of the power source 21a, and a switch 21c for switching connection between the constant current source 21 and the exterior portion.

The A/D converter 22 has a switch 22a for switching connection between the A/D converter 22 and the exterior portion, and a hold capacitor C$_{HOLD}$. Note that, V$_{SS}$ represents ground voltage.

The control unit 23 performs switching control of the switches 20$_1$ to 20$_N$ and 20$_{CAL}$ of the MUX 20, control of the FET 21b of the constant current source 21 and switching control of the switch 21c, control of the A/D converter 22 and switching control of the switch 22a of the A/D converter 22, and switching control of the FET$_1$ and FET$_2$. Here, FET$_1$ and FET$_2$ are provided as a measure against surge current.

In the touch panel 3, a touch detection area is covered with a cover such as PET (Polyethylene terephthalate) film or glass and the electrodes 30$_1$ to 30$_N$ arranged in a matrix are formed on a back side of the cover by depositing a conducting layer such as conductive polymer or ITO by printing or sputtering. The electrodes 30$_1$ to 30$_N$ are each composed of a pair of electrodes (i.e., two electrodes). Note that, the touch panel 3 may be provided so as to overlap a display.

Operation

An operation of the input device 1 will be described below in reference to FIGS. 1 to 3. FIG. 3 is a flow chart showing an example of an operation of the input device 1.

Firstly, the control unit 23 controls the MUX 20 to start with the electrode 30$_1$ sequentially followed by others (S1) and to switch the switches 20$_2$ to 20$_N$ and 20$_{CAL}$ of the other electrodes 30$_2$ to 30$_N$ and R$_{CAL}$ into an off-state, i.e., an "OPEN" state, and controls the A/D converter 22 to measure capacitance AD$_{OPEN}$ (Cs) of the electrode 30$_1$ in an on-state of the switch 20$_1$ of the electrode 30$_1$ (S2).

Here, capacitance is measured as described below.

Firstly, the control unit 23 controls the constant current source 21 to charge the electrode 30$_1$ and the hold capacitor C$_{HOLD}$ for a certain period of time.

Next, the control unit 23 controls the A/D converter 22 to measure voltage V. The voltage V to be measured is expressed by the following equation (1):

$$V = \frac{i \times t_{charge}}{c_{hold} + c_p} \quad (1)$$

where i is an electric current of the constant current source 21, t$_{charge}$ is charge time, Cp is parasitic capacitance of the electrode 30$_1$ and C$_{hold}$ is a capacitance of the hold capacitor C$_{HOLD}$.

Meanwhile, the voltage V measured by the A/D converter 22 is expressed by the following equation (2) where Cf is capacitance between a finger as an example of a touch object and the electrodes 30$_1$ to 30$_N$ which is generated when a user touches the touch panel 3:

$$V = \frac{i \times t_{charge}}{c_{hold} + c_p + cf} \quad (2)$$

The A/D converter 22 measures the capacitance AD$_{OPEN}$ (Cs) based on the equations (1) and (2).

Next, the control unit 23 controls the MUX 20 to switch the switches 20$_2$ to 20$_N$ and 20$_{CAL}$ of the other electrodes 30$_2$ to 30$_N$ and R$_{CAL}$ into a grounded state, i.e., a "LOW" state, and controls the A/D converter 22 to measure capacitance AD$_{LOW}$ (Cs) of the electrode 30$_1$ in the on-state of the switch 20$_1$ of the electrode 30$_1$ (S3).

Next, in order to determine whether or not the capacitance measured by the A/D converter 22 includes noise (S4), the control unit 23 calculates a difference between the capacitance AD$_{OPEN}$ (Cs) measured by the A/D converter 22 in Step S2 and the capacitance AD$_{LOW}$ (Cs) measured in Step S3.

Figure 2:
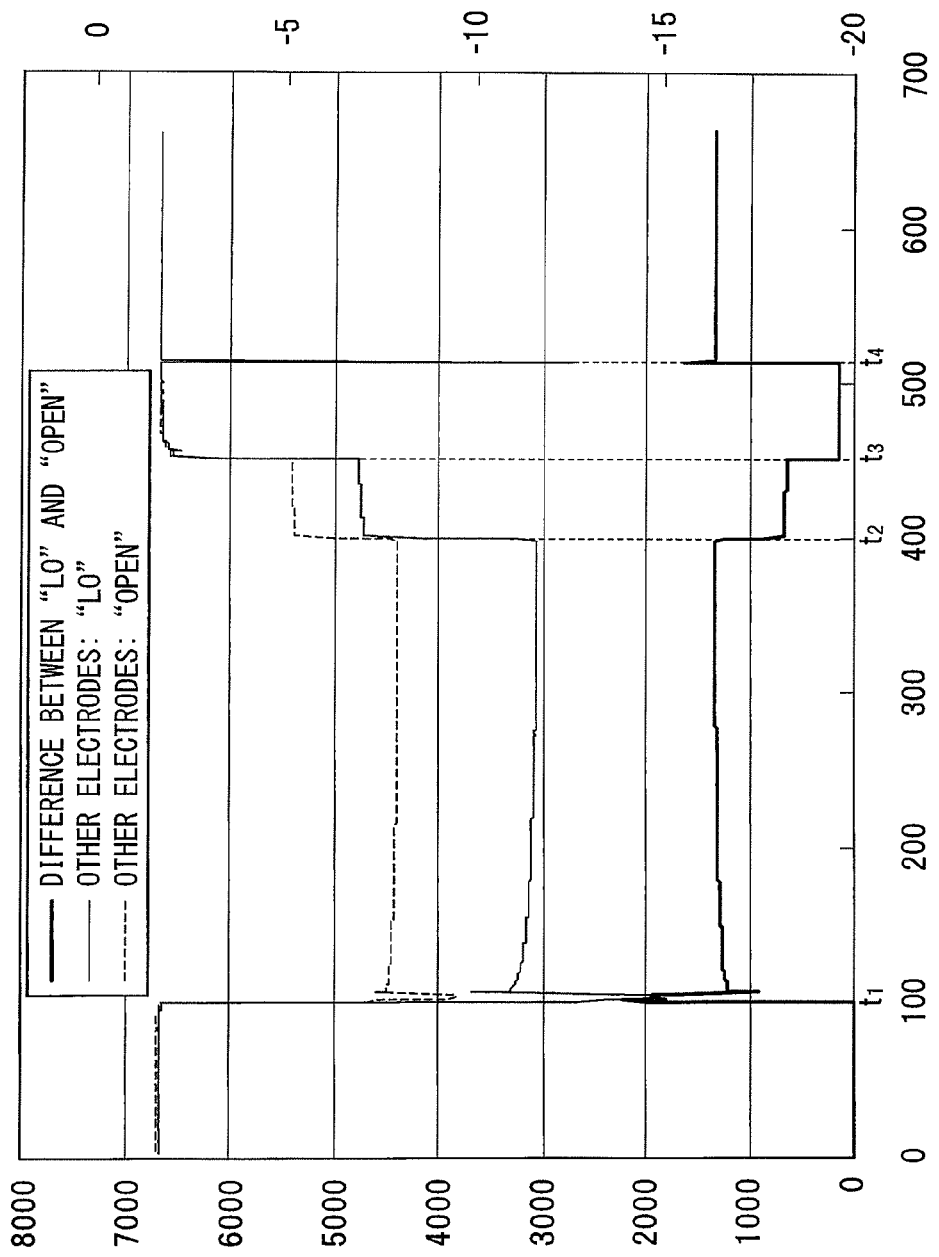
FIG. 2 is a schematic graph showing an example of an operation of the input device.
Figure 3:
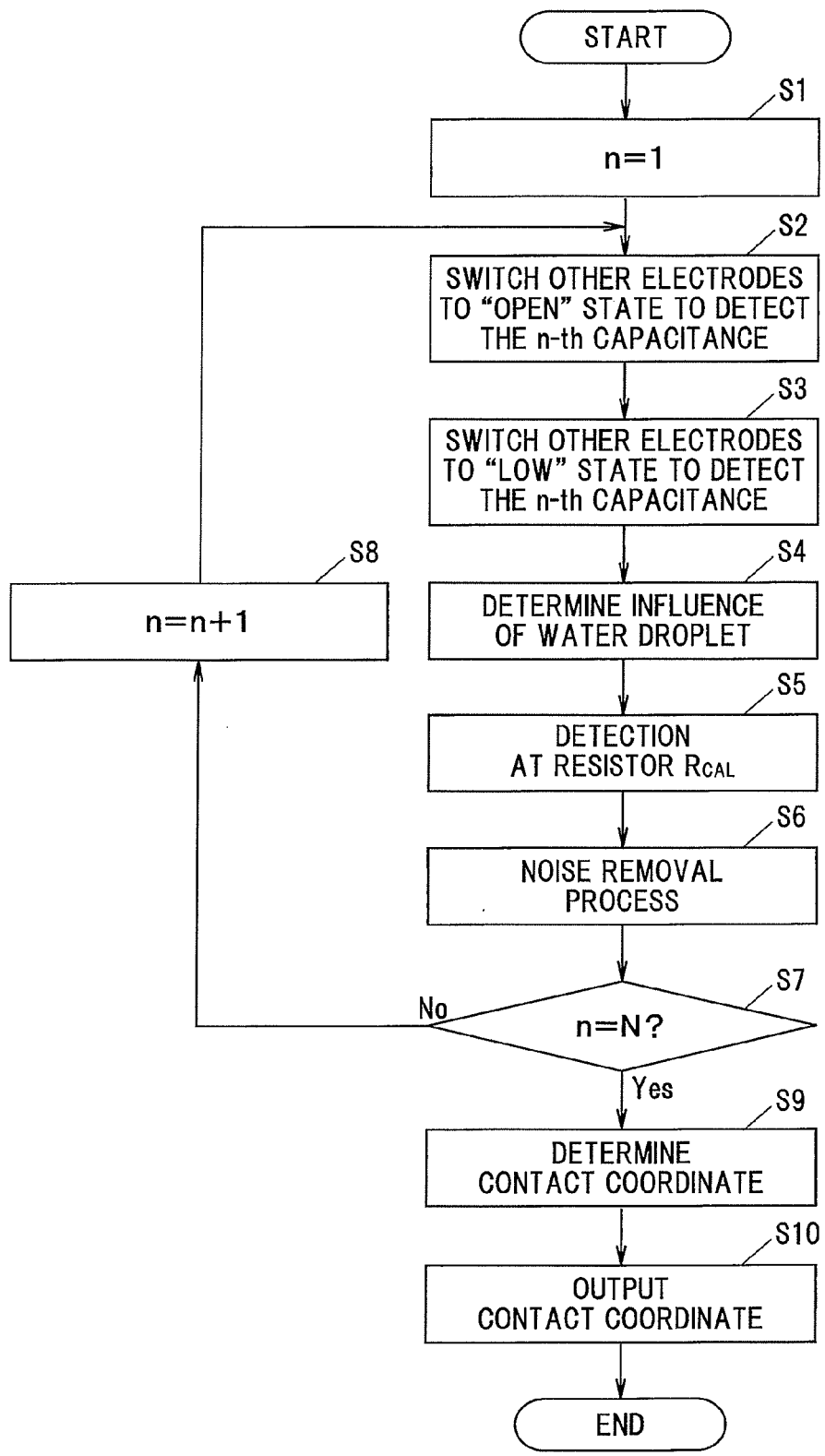
FIG. 3 is a flow chart showing an example of an operation of the input device.

FIG. 2 is a schematic graph showing an example of an operation of the input device 1.

In FIG. 2, the capacitance measured by the A/D converter 22 in Step S2 is indicated by a broken line, the capacitance measured in Step S3 is indicated by a thin solid line and the calculated difference therebetween is indicated by a thick solid line.

In general, there is no difference between the capacitance AD$_{OPEN}$ (Cs) measured by the A/D converter 22 in Step S2 and the capacitance AD$_{LOW}$ (Cs) measured in Step S3 in a state that a water droplet is not present on the touch panel 3 and thus has no effect (from time 0 to t$_1$) but a difference occurs between the capacitance AD$_{OPEN}$ (Cs) measured by the A/D converter 22 in Step S2 and the capacitance AD$_{LOW}$ (Cs) measured in Step S3 in a state that a water droplet is present on the touch panel 3 and has an effect (at t$_1$ and later). This is a difference between the cases in which capacitive coupling due to the water droplet leads to connection to GND and in which not, as shown in FIGS. 4A to 4D.

FIGS. 4A to 4D are schematic views showing an example of a circuit configuration when a water droplet is present on a contact detection surface 31 of the touch panel 3.

Figure 4B:
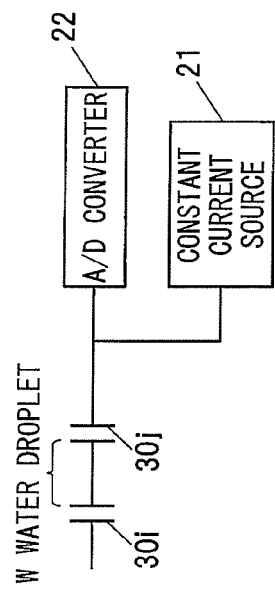
FIGS. 4A to 4D are schematic views showing an example of a circuit configuration when a water droplet is present on a contact detection surface of a touch panel.
Figure 4D:
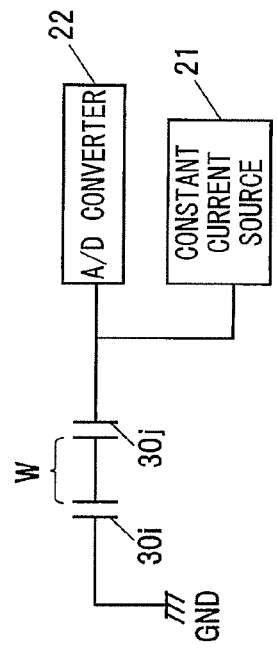
Figure 4A:
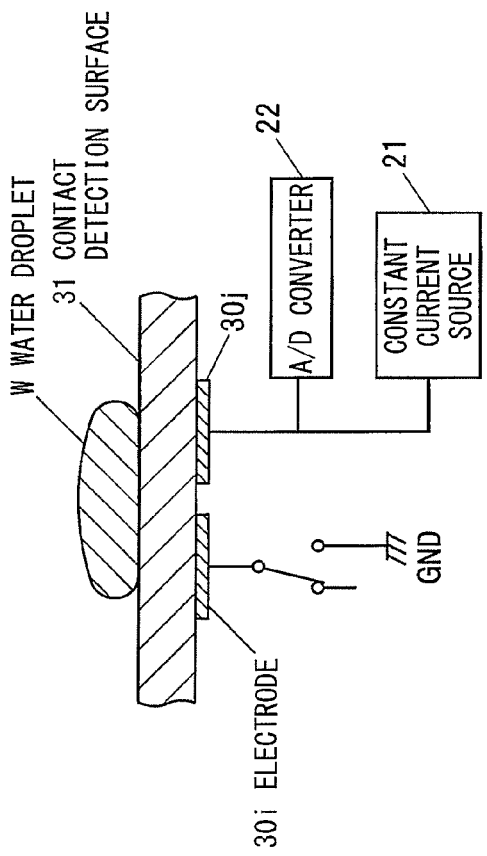

As shown in FIG. 4A, when a water droplet is present on the contact detection surface 31 of the touch panel 3 and the other electrodes are in the "OPEN" state in order to measure the capacitance AD$_{OPEN}$ (Cs) of the electrode 30$_j$, a capacitor composed of the contact detection surface 31 and the electrode 30$_j$ is connected in series to a capacitor composed of the contact detection surface 31 and the electrode 30$_i$ due to influence of the water droplet W as shown in FIG. 4B and the capacitor composed of the contact detection surface 31 and the electrode 30$_i$ is in a non-grounded state since the electrode 30$_i$ is in the "OPEN" state.

Figure 4C:
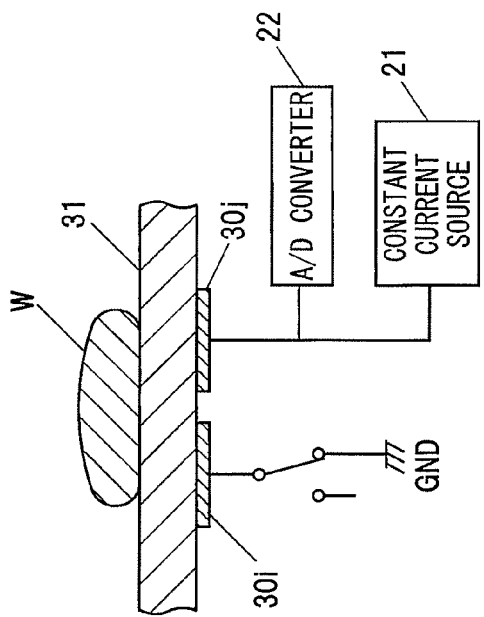

On the other hand, as shown in FIG. 4C, when the water droplet is present on the contact detection surface 31 of the touch panel 3 and the other electrodes are grounded and are in the "LOW" state in order to measure the capacitance AD$_{LOW}$ (Cs) of the electrode 30$_j$, the capacitor composed of the contact detection surface 31 and the electrode 30$_j$ is connected in series to the capacitor composed of the contact detection surface 31 and the electrode 30$_i$ due to influence of the water droplet W as shown in FIG. 4D and the capacitor composed of the contact detection surface 31 and the electrode 30$_i$ is in a grounded state since the electrode 30$_i$ is in the "LOW" state.

Characteristics between times t$_1$ and t$_2$ in FIG. 2 are observed when, e.g., the water droplet is attached on the touch panel 3 and causes short-circuit between plural electrodes. In addition, since the water droplet was wiped off at the times t$_2$, $t_3$ and $t_4$, influence of the water droplet decreases in a stepwise manner from between the times $t_2$ and $t_3$, between the times $t_3$ and $t_4$ to time $t_4$ and later.

The control unit 23 calculates the difference between the capacitance $AD_{OPEN}$ (Cs) measured by the A/D converter 22 in Step S2 and the capacitance $AD_{LOW}$ (Cs) measured in Step S3 based on the above-mentioned characteristics, thereby determining whether or not the water droplet has an effect on the measured capacitance (S4).

Next, the A/D converter 22 turns on the switch $20_{CAL}$ of the resistor $R_{CAL}$ in the off-state of the switches $20_1$ to $20_N$ of the electrodes $30_1$ to $30_N$, and detects a measured value AD ($R_{CAL}$) at the time of providing the constant current i to the resistor $R_{CAL}$ (S5).

Here, when noise is included in the capacitance $AD_{OPEN}$ (Cs) measured by the A/D converter 22 in Step S2 and the measured value AD ($R_{CAL}$) measured by the A/D converter 22 in Step S5, the capacitance $AD_{OPEN}$ (Cs) and the measured value AD ($R_{CAL}$) are expressed by the following equations (3) and (4):

$$AD_{OPEN}(C_S) = \alpha_{NZ} \times ad_{OPEN}(C_S) \quad (3)$$

$$AD(R_{CAL}) = \alpha_{NZ} \times ad(R_{CAL}) \quad (4)$$

where capacitances not including noise are respectively $ad_{OPEN}$ (Cs) and ad ($R_{CAL}$).

Therefore, calculating a ratio thereof allows the control unit 23 to ignore the influence of noise $\alpha_{ZN}$ and noise is removed based on the following equation (5) (S6):

$$\frac{AD_{OPEN}(C_S)}{AD(R_{CAL})} = \frac{\alpha_{NZ} \times ad_{OPEN}(C_S)}{\alpha_{NZ} \times ad(R_{CAL})} = \frac{ad_{OPEN}(C_S)}{ad(R_{CAL})} \quad (5)$$

Note that, the processes in Steps S2 to S6 are performed on all electrodes for, e.g., 50 μsec per electrode (S7 and S8).

Next, based on the value calculated by the equation (5), the control unit 23 determines a coordinate on the touch panel where a finger of the user, etc., touched (S9).

Next, the control unit 23 outputs the determined coordinate on the touch panel as a contact coordinate value (S10).

The output contact coordinate value is converted into a control signal at the exterior portion or the control unit 23 by referring, e.g., a non-illustrated table associating a preliminarily prepared coordinate value with a control signal and is used to control, e.g., air conditioner or audio device in a vehicle or operation of portable music player or mobile phone, etc.

Effects of the Embodiment

In the embodiment, since the calibration resistor $R_{CAL}$ is connected to the MUX 20 and the ratio of the measured value, which is measured when the calibration resistor $R_{CAL}$ is selectively connected, to the capacitance, which is measured when one of the electrodes $30_1$ to $30_N$ is selectively connected, is calculated, it is possible to detect contact of the touch object with the touch panel 3 by suppressing influence of noise.

In addition, since the difference between capacitance $AD_{OPEN}$ (Cs) measured by the A/D converter 22 in Step S2 and the capacitance $AD_{LOW}$ (Cs) measured in Step S3 is calculated, it is possible to determine that noise is included in the measured capacitance in case that the difference is not 0.

It should be noted that the invention is not intended to be limited to the embodiment and the various kinds of modifications can be implemented without departing from and adjusting the technical idea of the invention.

What is claimed is:

1. An input device, comprising:
   a selection circuit that is connected to a plurality of electrodes provided on a capacitive touch panel and selectively connects the plurality of electrodes;
   a calibration resistor connected to the selection circuit;
   a constant current source for supplying constant current power to the plurality of electrodes and the calibration resistor;
   an A/D converter connected to the selection circuit to measure capacitance of the plurality of electrodes and a measured value measured when the calibration resistor is connected; and
   a control unit controlling the selection circuit to make the A/D converter measure the capacitance of one of the plurality of electrodes and the measured value measured when the calibration resistor is connected, and determining a contact coordinate of the touch object on a touch panel by calculating a ratio of the capacitance to the measured value,
   wherein the measured value measured when the calibration resistor is connected is measured when disconnecting all of the plurality of electrodes, and
   wherein the calibration resistor is connected in parallel with the plurality of electrodes to the selection circuit.

2. The input device according to claim 1, wherein the control unit controls the selection circuit to disconnect the plurality of electrodes except the one electrode so that the A/D converter measures a first capacitance of the one of the plurality of electrodes and then to ground the plurality of electrodes except the one electrode so that the A/D converter measures a second capacitance of the one of the plurality of electrodes, and compares the first and second capacitances to determine whether or not a water droplet is present on a detection surface of the touch panel.

3. The input device according to claim 1, wherein the plurality of electrode each comprise a pair of electrodes.

4. The input device according to claim 1, wherein the capacitance of the one of the plurality of electrodes is measured when disconnecting the plurality of electrodes except the one of the plurality of electrodes.

5. The input device according to claim 2, wherein when there is a difference between the first capacitance and the second capacitance, it is determined that the water droplet is present on the detection surface of the touch panel.

* * * * *